US012646928B2

(12) United States Patent
Lv et al.

(10) Patent No.: US 12,646,928 B2
(45) Date of Patent: Jun. 2, 2026

(54) CURRENT PROTECTION-TYPE SEMICONDUCTOR DEVICE

(71) Applicant: Nanjing Sinnopower Technology Co., Ltd., Nanjing (CN)

(72) Inventors: Xinjiang Lv, Nanjing (CN); Xuqiang Zhu, Nanjing (CN); Wenfang Du, Nanjing (CN)

(73) Assignee: Nanjing Sinnopower Technology Co., Ltd., Nanjing (CN)

( * ) Notice: Subject to any disclaimer, the term of this patent is extended or adjusted under 35 U.S.C. 154(b) by 397 days.

(21) Appl. No.: 18/577,951

(22) PCT Filed: Jan. 13, 2022

(86) PCT No.: PCT/CN2022/071710
§ 371 (c)(1),
(2) Date: Jan. 9, 2024

(87) PCT Pub. No.: WO2023/123564
PCT Pub. Date: Jul. 6, 2023

(65) Prior Publication Data
US 2024/0322558 A1 Sep. 26, 2024

(30) Foreign Application Priority Data
Dec. 27, 2021 (CN) .......................... 202111609485.0

(51) Int. Cl.
*H02H 9/00* (2006.01)
*H02H 9/02* (2006.01)

(52) U.S. Cl.
CPC .............. *H02H 9/02* (2013.01); *H02H 9/005* (2013.01)

(58) Field of Classification Search
CPC ................................. H02H 9/02; H02H 9/005
See application file for complete search history.

(56) References Cited

U.S. PATENT DOCUMENTS

| | | | | |
|---|---|---|---|---|
| 5,780,878 A | * | 7/1998 | Bhatnagar | .......... H10D 62/8325 |
| | | | | 257/329 |
| 6,075,259 A | | 6/2000 | Baliga | |
| 2010/0025756 A1 | | 2/2010 | Fu et al. | |

FOREIGN PATENT DOCUMENTS

| | | |
|---|---|---|
| CN | 10157324 A | 9/2009 |
| CN | 102347372 A | 2/2012 |
| CN | 109037327 A | 12/2018 |

OTHER PUBLICATIONS

International Search Report from PCT/CN2022/071710 dated Sep. 13, 2022, two (2) pages.

* cited by examiner

*Primary Examiner* — Suberr L Chi
(74) *Attorney, Agent, or Firm* — Greenberg Traurig, LLP

(57) ABSTRACT

A current protection-type semiconductor device includes an internal resistance that may be instantaneously changed from a low resistance to a high resistance when an overload current appears in a circuit, thereby blocking other elements in a surge current protection circuit. The device comprises an (N+)-type semiconductor substrate, and an N-type voltage-sustaining layer arranged above the (N+)-type semiconductor substrate which serves as a main layer of the device for sustaining a voltage. At least one N-type converter area and at least one P-type source body area are arranged on an upper surface of the N-type voltage-sustaining layer. At least one P-type buried layer is further arranged in the N-type voltage-sustaining layer, and the P-type buried layer is surrounded by the N-type voltage-sustaining layer. Under different voltages between two ports of a TBC, the internal resistance of the TBC is switched between two different states of low resistance and high resistance.

15 Claims, 10 Drawing Sheets

CURRENT PROTECTION-TYPE SEMICONDUCTOR DEVICE

CROSS REFERENCE TO RELATED APPLICATION

This application is a United States National Phase Application of International Application No. PCT/CN2022/071710, filed Jan. 13, 2022, which claims priority to CN 202111609485.0, filed Dec. 27, 2021, each of which is incorporated herein by reference in its entirety.

FIELD OF THE DISCLOSURE

The present disclosure relates to semiconductor devices, in particular to a current protection-type semiconductor device with respect to high voltage and/or high power.

BACKGROUND OF RELATED ART

The semiconductor protection devices are widely used in the fields of consumer electronics, white household appliances, industrial control, electrical electronics and national defense electronics, and the like. As an electronic component that instantaneously releases excessive voltage or current, the protection device in a normal state is only used as an auxiliary component of the main circuit without participating in or affecting the normal circuit function of the main circuit. Only when voltage across the protection device or current flowing through the protection device exceeds a certain threshold, the protection device enters a protection operation state to achieve the purpose of protecting the main circuit.

At present, the protection mode of the protection device is usually voltage protection, i.e., when the voltage across the protected line is overloaded, the equivalent impedance of the protection device will change, so as to suppress the voltage overshoot and achieve the effect of protecting the circuit (as shown by the dotted line in FIG. 1). However, when current overload occurs in the circuit, the protection effect of a voltage protection-type device is limited, therefore it is necessary to employs a current protection-type device or a system with a combination of current protection type and voltage protection type.

At present, most current protection-type devices are temperature-dependent thermosensitive elements. When the current flowing through a thermosensitive element exceeds a rated value, the temperature of the thermosensitive element increases, and the equivalent impedance thereof increases accordingly, thereby weaken the overload current to achieve the protection purpose. Apparently, the thermosensitive type current protection devices wait for temperature change to produce protection effects, and their response rate is too slow, which are not suitable for application fields with high requirements for response rate, such as lightning and surge protection for high-speed digital communication interfaces. Therefore, there is an urgent need for a current protection-type semiconductor device with a high response rate (at microsecond or even nanosecond level).

SUMMARY

The present disclosure discloses a current protection-type semiconductor device, i.e., an ultra-fast current transient blocking component (TBC), and the technical objective thereof is that: in an initial state of normal operation of the circuit, the current TBC is in a low resistance state; when the current in the circuit exceeds a maximum peak current of the TBC, an equivalent impedance of the TBC will be changed from a low resistance to a high resistance in microseconds or even nanoseconds, thereby blocking the surge current in the circuit (the current-voltage output characteristic curve of the TBC is shown by the solid lines in FIG. 1); when the surge voltage disappears or the value of voltage across the current TBC is small, the equivalent impedance of the TBC will return from the high resistance to the initial low resistance.

The above technical objective of the present disclosure is achieved with the following technical solutions:

A current protection-type semiconductor device is provided, which includes at least one cell structure, including a substrate region, and a first-conduction-type voltage-sustaining layer arranged above the substrate region;

where a first-conduction-type current-commutation region and at least one second-conduction-type source-body region are arranged on an upper surface of the voltage-sustaining layer; at least one second-conduction-type buried layer is arranged in the voltage-sustaining layer and surrounded by the voltage-sustaining layer;

a bottom of the substrate region is in contact with a first electrode; a second electrode and a floating ohmic contact electrode are arranged on an upper surface of the voltage-sustaining layer, the second electrode is in contact with the source-body region, and the floating ohmic contact electrode is in contact with the current-commutation region and the source-body region;

a conduction type of the substrate region is a first conduction type or a second conduction type, and when the substrate region is the first conduction type, a doping concentration of the substrate region is not less than that of the voltage-sustaining layer.

Furthermore, when a conduction type of the substrate region is the second conduction type, a first-conduction-type field-stop layer is arranged between the substrate region and the voltage-sustaining layer.

Furthermore, a first-conduction-type anode short-circuit region is arranged in the substrate region, and one side of the anode short-circuit region is in contact with the field-stop layer and the other side of the anode short-circuit region is in contact with the first electrode.

Furthermore, a super-junction structure with an alternating arrangement of the first conduction type and the second conduction type is arranged in the voltage-sustaining layer.

Furthermore, a first-conduction-type charge compensation region is arranged in an upper surface inside the source-body region.

Furthermore, a plane metal-insulator-semiconductor structure is arranged on an upper surface outside the source-body region, and a metal layer of the plane metal-insulator-semiconductor structure is a third electrode.

Furthermore, a trench-type metal-insulator-semiconductor structure is arranged on an upper surface inside the source-body region, and a metal layer of the trench-type metal-insulator-semiconductor structure is a third electrode.

The present disclosure has the following beneficial technical effects. The current protection-type semiconductor device of the present disclosure includes a substrate region and a first-conduction-type voltage-sustaining layer arranged above the substrate region. A first-conduction-type current-commutation region and at least one second-conduction-type source-body region are arranged on an upper surface of the voltage-sustaining layer; at least one second-conduction-type buried layer is arranged in the voltage-sustaining layer and surrounded by the voltage-sustaining layer; a bottom of the substrate region is in contact with a first electrode; a second electrode and a floating ohmic contact (FOC) electrode are arranged on an upper surface of the voltage-sustaining layer, the second electrode is in contact with the source-body region, and the FOC electrode is in contact with the current-commutation region and the source-body region.

The internal resistance of the semiconductor device can be instantaneously changed from a low resistance to a high resistance when an overload current occurs in a circuit, thereby achieving the objective of rapidly blocking other elements in a surge current protection circuit, and the response time is microseconds or even nanoseconds

DETAILED DESCRIPTION

Figure 1:
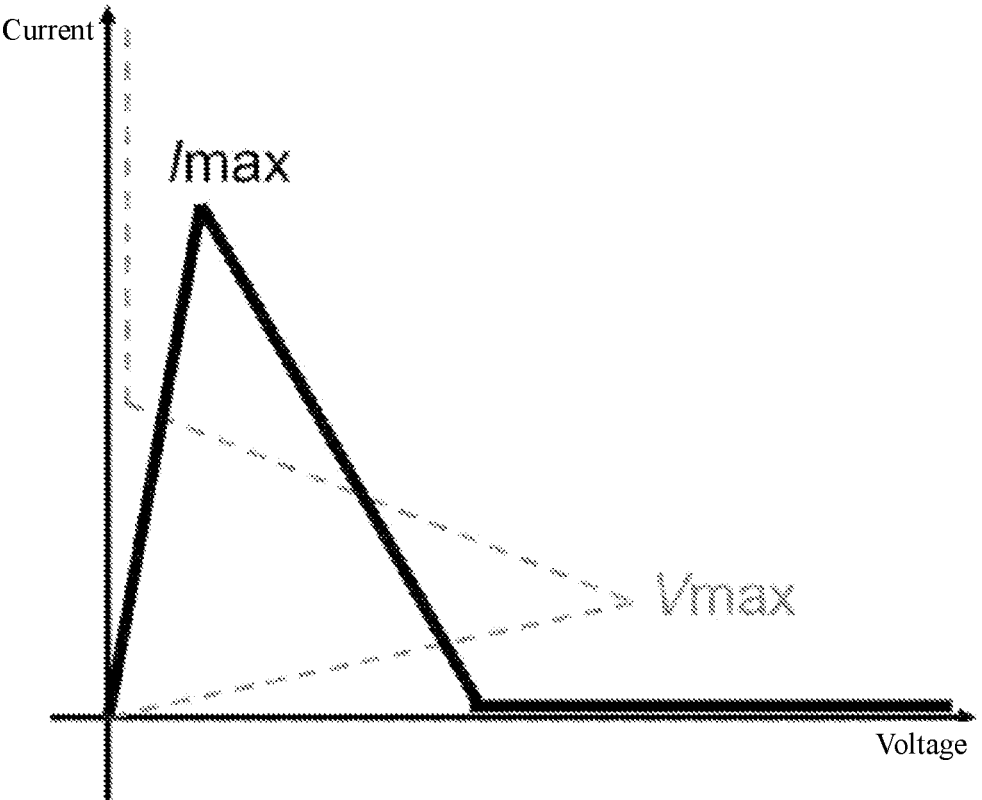
FIG. 1 is a schematic diagram of current-voltage output characteristic curves of a voltage protection-type semiconductor device (dotted line) and the current protection-type semiconductor device (solid line) according to the present disclosure.

The technical solution of the present disclosure will be explained in detail with reference to the accompanying drawings. In the description, it should be understood that the terms "first", "second" and "third" are only used for illustrative purposes, but should not be understood to indicate or imply relative importance or to implicitly indicate the number of indicated technical features; instead, they are only used to distinguish different components. In the description, a first conduction type includes N-type and P-type, and a second conduction type also includes N-type and P-type. When the first conduction type is N-type, the second conduction type is P-type; and when the first conduction type is P-type, the second conduction type is N-type.

In addition, the orientation or position relations indicated by the terms "up, "down", "front", "back", "left", "right", "top", "bottom", "side wall", "vertical", "horizontal", and "upper surface", etc., are based on the orientation or position relations shown in the accompanying drawings. They are used only to facilitate and simplify the description of the present disclosure, rather than to indicate or imply that the device or components referred to should have a specific orientation or should be constructed and operated in a specific orientation. Therefore, these terms shall not be understood as limitations to the present disclosure.

The drawings and description should be considered to be illustrative in nature rather than limiting. In the drawings, units with similar structures are represented by same reference numbers. In addition, in order to facilitate comprehension and description, the size and thickness of each component shown in the drawings are shown arbitrarily, but the present application is not limited thereto.

In the drawings, configuration ranges of apparatuses, systems, components and circuits are exaggerated for the purpose of clarity, understanding and ease of description. It should be understood that when a component is described to be "above" another component, the component may be directly on the other component, or an intermediate component may exist therebetween.

In addition, in the description, unless otherwise described explicitly to be the contrary, the term "comprise" or "include" and variants thereof should be understood as including the described components, but not excluding any other components. In addition, in the description, the term "above . . . " means to be above or below the target component, and does not mean to be on the top of gravity-based direction.

In order to further explain the technical means of the present application to achieve the intended objective and their effects, a high-voltage and/or high-power active protection semiconductor device proposed in the present application, and specific implementations, structures, features and effects of the device will be detailed in combination with the drawings and specific embodiments below.

FIG. 1 is typical voltage-current characteristic curves based on a voltage protection-type semiconductor device (dotted lines) and a current protection-type semiconductor device (solid lines). When a bias voltage across a voltage protection-type semiconductor device is small, the device exhibits a high-resistance characteristic; and when the voltage across the device reaches a critical maximum trigger voltage VMAX, the device instantaneously changes to a low-resistance characteristic so as to block the voltage. For a current protection-type semiconductor device, when the current flowing through the device is small, the device exhibits a low-resistance characteristic. When the current flowing through the device reaches a critical maximum trigger current IMAX, the device instantaneously changes to a high-resistance characteristic so as to block the current thereby protecting the circuit from impact of surge current.

Figure 2:
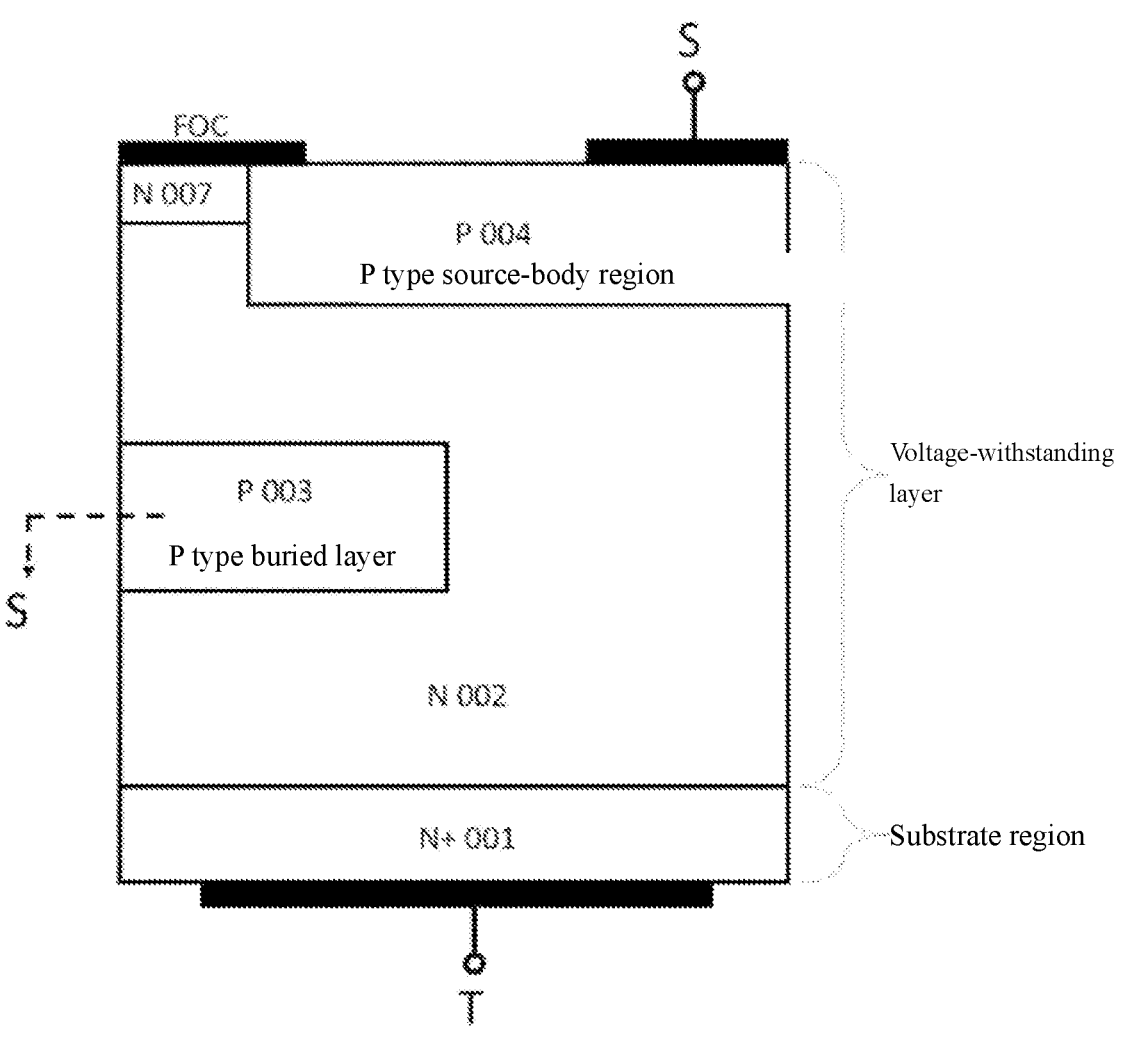
FIG. 2 is a schematic diagram of a cell structure of the current TBC chip according to the present disclosure.

In order to obtain the voltage-current output characteristic curves of the current protection-type semiconductor device as shown in FIG. 1, the present disclosure proposes a super-fast current transient blocking component, and the device includes multiple cell units. FIG. 2 is a schematic sectional view of one cell structure of a super-fast current transient blocking component (TBC) proposed by the present disclosure. As a specific embodiment, the cell structure includes a (N+)-type semiconductor substrate 001, and a N-type voltage-sustaining layer 002 arranged above the (N+)-type semiconductor substrate 001. The N-type voltage-sustaining layer 002 is a layer that mainly withstands the voltage across the device. At least one N-type current-commutation region 007 and at least one P-type source-body region 004 are arranged in an upper surface of the N-type voltage-sustaining layer 002. At least one P-type buried layer 003 is arranged in the N-type voltage-sustaining layer 002, is surrounded by the N-type voltage-sustaining layer 002. A first electrode T and a second electrode S include or are made of metal materials. The first electrode T is in direct contact with the (N+)-type semiconductor substrate 001, and the second electrode S is in direct contact with the P-type source-body region 004. In addition, at least one floating ohmic contact (FOC) electrode is included, which is in contact with at least part of the N-type current-commutation region 007 and at least part of the P-type source-body region 004. The FOC electrode forms ohmic contacts with the N-type current-commutation region 007 and the P-type source-body region 004 respectively. The potential of the P-type buried layer 003 is equal to that of the second electrode S.

The main electrical characteristics of the super-fast current TBC provided by the present disclosure will be described below in an embodiment shown in FIG. 2:

(1) When a bias voltage $V_{ST}$ between the first electrode T and the second electrode S increases from 0 and the value of $V_{ST}$ is small, the first electrode T and the second electrode S in the embodiment shown in FIG. 2 exhibit a low resistance characteristic. That is because most of the N-type voltage-sustaining layer 002 has not been depleted when the value of $V_{ST}$ is small. While the (N+)-type substrate region 001, the neutral N-type voltage-sustaining layer 002 and the N-type current-commutation region 007 have equal potential, that is to say, the potential of the FOC electrode is equal to that of the first electrode T. Therefore, the voltage between the FOC electrode and the electrode S is equal to the value of $V_{ST}$, and there is an electric field from the FOC region to the electrode S in the P-type source-body region 004. Apparently, majority carriers (holes) in the P-type source-body region 004 flow from the FOC electrode to the electrode S through the P-type source-body region 004. In order to ensure current continuity, majority carriers (electrons) in the N-type voltage-sustaining layer 002 flow from the FOC electrode to the first electrode T through the N-type current-commutation region 007, the N-type voltage-sustaining layer 002 and the (N+)-type substrate region 001, thus forming continuous current between the electrode T and the electrode S. The equivalent resistance of the device is the resistance of the P-type source-body region 004, the N-type current-commutation region 007, the N-type voltage-sustaining layer 002 and the (N+)-type substrate region 001 which are serially connected. Apparently, when the value of $V_{ST}$ is small, the equivalent resistance of the device exhibits a low resistance characteristic.

(2) When the bias voltage $V_{ST}$ between the first electrode T and the second electrode S increases to a certain value, the resistance between the first electrode T and the second electrode S suddenly changes to a high resistance characteristic. That is because: as the value of $V_{ST}$ increases, the N-type voltage-sustaining layer 002 will be gradually depleted near the P-type buried layer 003 and the P-type source-body region 004. Corresponding depletion regions will also appear in the P-type buried layer 003 and the P-type source-body region 004, and the width of the depleted regions will increase with the increase of the value of $V_{ST}$. When the depletion regions expand so that the P-type buried layer 003 and the N-type voltage-sustaining layer 002 near the P-type source-body region 004 are completely depleted, there is no linear resistance characteristic among the N-type current-commutation region 007, the N-type voltage-sustaining layer 002 and the (N+)-type substrate region 001, and the electron current path in the N-type voltage-sustaining layer 002 exhibits a high differential resistance characteristic. As the value of $V_{ST}$ further increases, the depletion layers in the P-type buried layer 003 and the P-type source-body region 004 also expand gradually; when the value of $V_{ST}$ increases so that the most of the P-type source-body region 004 is depleted, the hole current path in the P-type source-body region 004 also exhibits a high differential resistance characteristic, and the current from the electrode T to the electrode S reaches a peak (as indicated by $I_{MAX}$ in FIG. 1). As the value of $V_{ST}$ further increases, most of the electric field lines emitted by positive charges of ionized donors in the depleted N-type region 002 are absorbed by negative charges of ionized acceptors in the depleted P-type source-body region 004, thereby changing the electric field distribution in the P-type source-body region 004. When the electric field direction in the P-type source-body region 004 changes from the original direction from the FOC to the electrode S, to a new direction from the electrode S to the FOC, there will no longer be a current path between the electrode T and the electrode S, i.e., there will be a blocking (high resistance) characteristic between the electrode T and the electrode S. The current decreases greatly when the voltage is large, as shown in FIG. 1.

(3) The time of the equivalent resistance between the first electrode T and the second electrode S from the low resistance to the high resistance can be microseconds or even nanoseconds. This is because that the establishment of the depletion layer in the semiconductor and the changes of the electric field distribution in corresponding semiconductor regions are at a nanosecond level.

Figure 3:
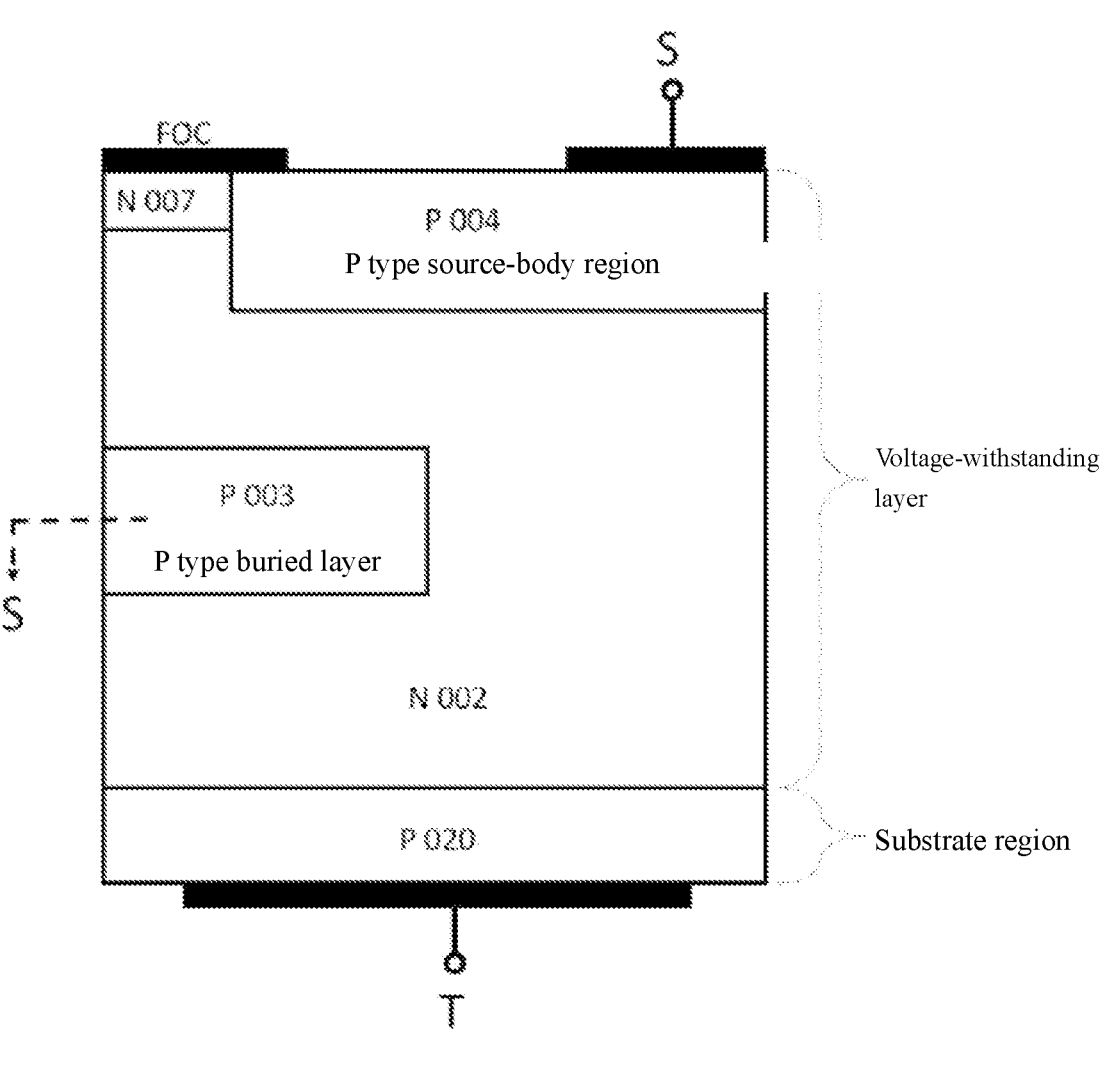
FIG. 3 is a schematic structural diagram of a first embodiment according to the present disclosure.

In the embodiment shown in FIG. 2, majority carriers are used as conductive carriers. Apparently, majority carriers and minority carriers may be used to conduct electricity at the same time (a bipolar type). FIG. 3 shows a specific implementation in which bipolar conduction is improved based on the embodiment in FIG. 2. The difference between the embodiment in FIG. 3 and the embodiment in FIG. 2 lies in that the substrate region of FIG. 3 employs a P-type substrate region 020. Similar to the principle of the embodiment in FIG. 2, when the value of $V_{ST}$ is small, most of the N-type voltage-sustaining layer 002 has not been depleted. Majority carriers (holes) in the P-type source-body region 004 flow from the FOC electrode to the electrode S through the P-type source-body region 004. In order to ensure current continuity, majority carriers (electrons) in the N-type voltage-sustaining layer 002 flow from the FOC electrode to the P-type substrate region 020 through the N-type current-commutation region 007 and the N-type voltage-sustaining layer 002, and finally to the first electrode T. As the electrons are injected into the P-type substrate region 020, minority carriers (holes) are further injected into the N-type voltage-sustaining layer 002 from the P-type substrate region 020 and finally reach the P-type source-body region 004, thus forming continuous current between the electrode T and the electrode S. Since two types of carriers are used to conduct electricity simultaneously, the equivalent resistance in the embodiment in FIG. 3 is less than that in the embodiment in FIG. 2. As the value of $V_{ST}$ further increases, some regions of the N-type voltage-sustaining layer 002, the P-type buried layer 003 and the P-type source-body region 004 are gradually depleted, and eventually there will be a blocking (high resistance) characteristic between the electrode T and the electrode S. The principle of resistance transition is similar to that in the embodiment in FIG. 2, which will not be repeated here.

Figure 4:
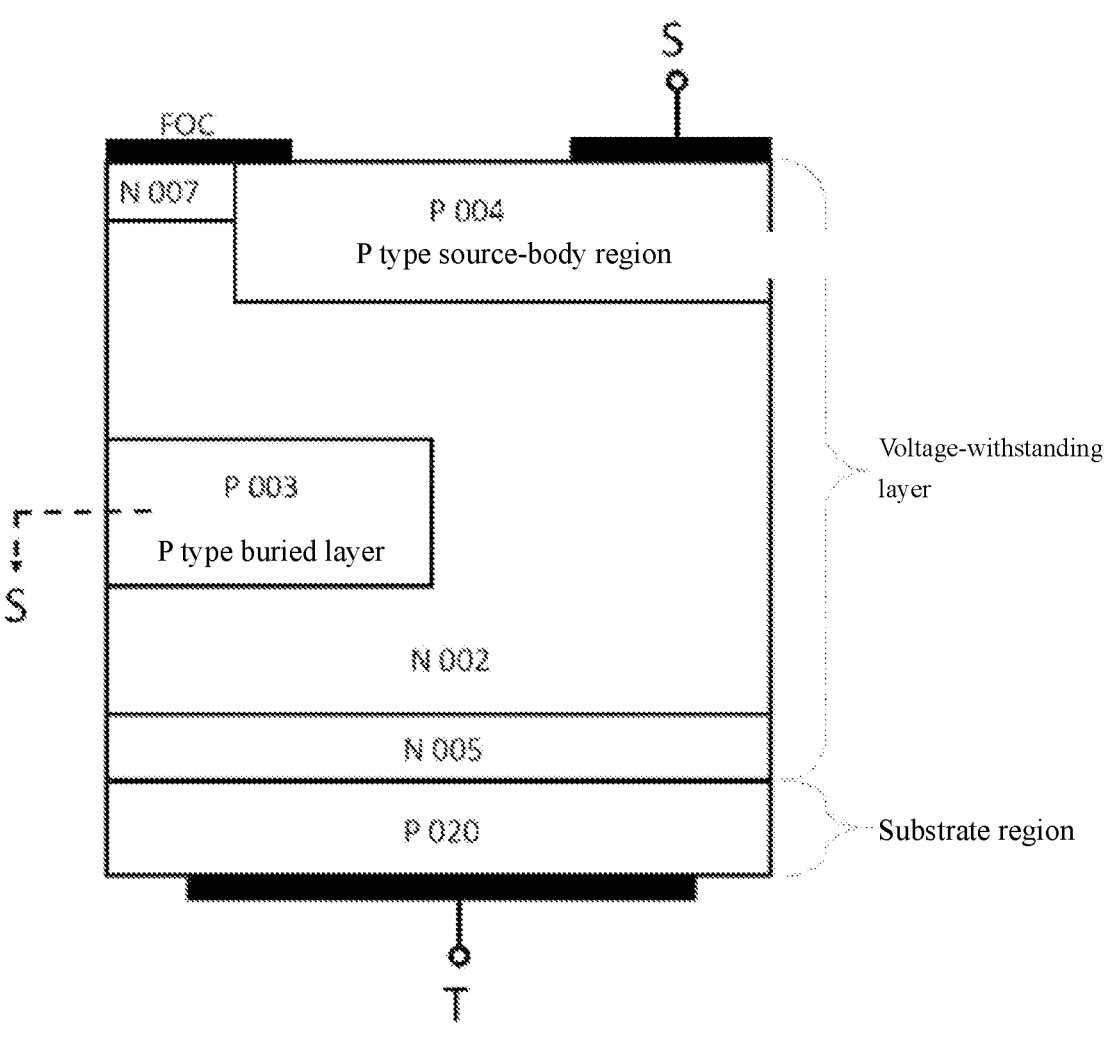
FIG. 4 is a schematic structural diagram of a second embodiment according to the present disclosure.

FIG. 4 is a schematic structural diagram of an embodiment in which an N-type electric field-stop layer 005 is added based on the embodiment in FIG. 3. Under the same sustaining voltage, the introduction of the N-type electric field-stop layer 005 in FIG. 4 can make the thickness of the N-type voltage-sustaining layer 002 smaller, thereby reducing the on-resistance of the device.

Figure 5:
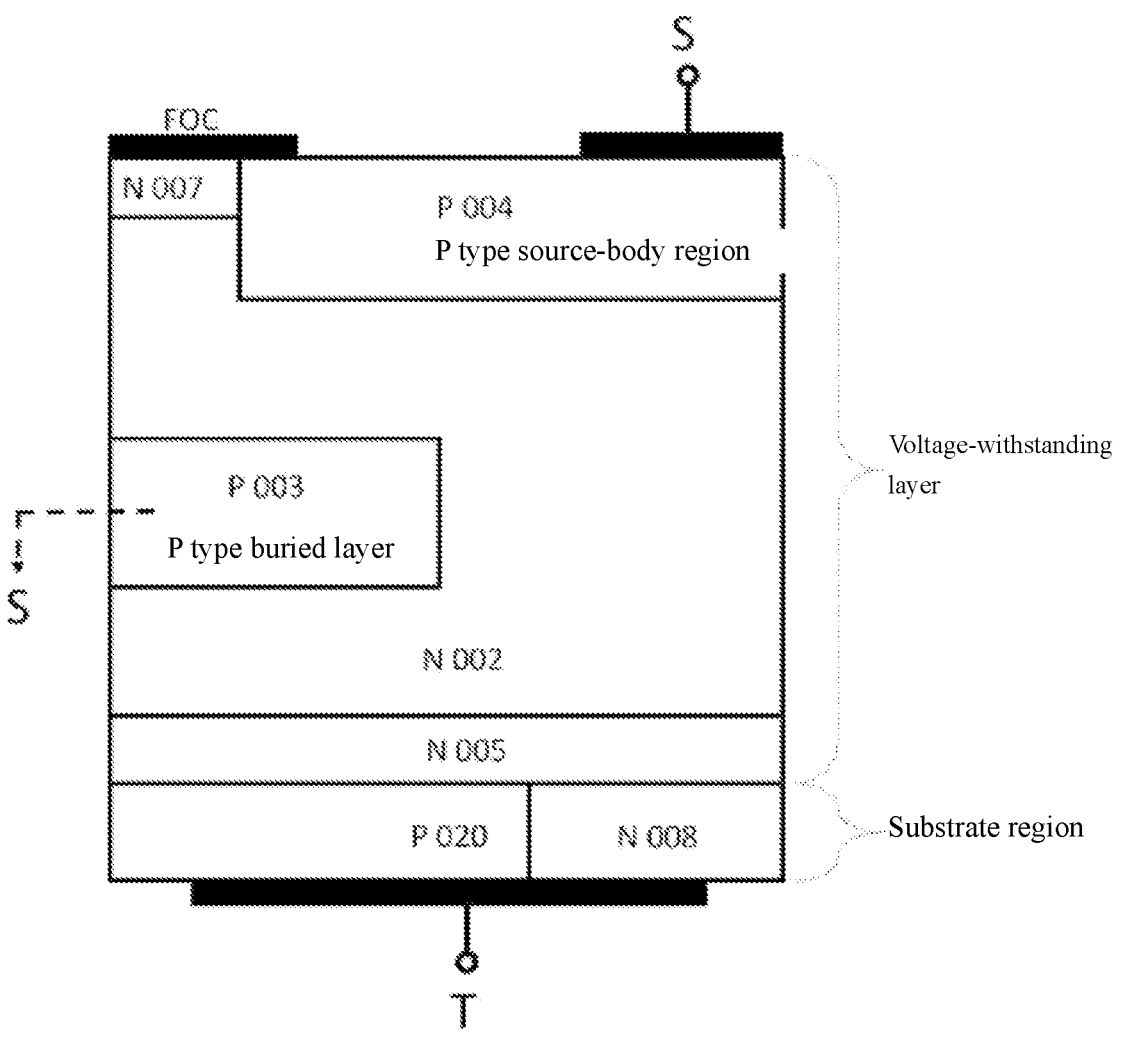
FIG. 5 is a schematic structural diagram of a third embodiment according to the present disclosure.

FIG. 5 is a schematic structural diagram of an embodiment in which a N-type anode short-circuit region 008 is added in the P-type substrate region based on the embodiment in FIG. 4. One side of the N-type anode short-circuit region 008 is in contact with the N-type electric field-stop layer 005, and the other side of the N-type anode short-circuit region 008 is in direct contact with the electrode T. Due to the existence of the N-type region 008, a PN diode structure is formed among the P-type source-body region 004, the N-type voltage-sustaining layer 002, the N-type electric field-stop region 005 and the N-type anode short-circuit region 008, so that there is current conduction from the electrode S to the electrode T in FIG. 5.

Unless specifically explained, all embodiments provided below will be described based on the substrate structure of the embodiment in FIG. 2, and should not be interpreted in any way to limit the scope of protection of the present disclosure The embodiments provided below are also applicable to the substrate structure shown in FIGS. 3 to 5.

Figure 6:
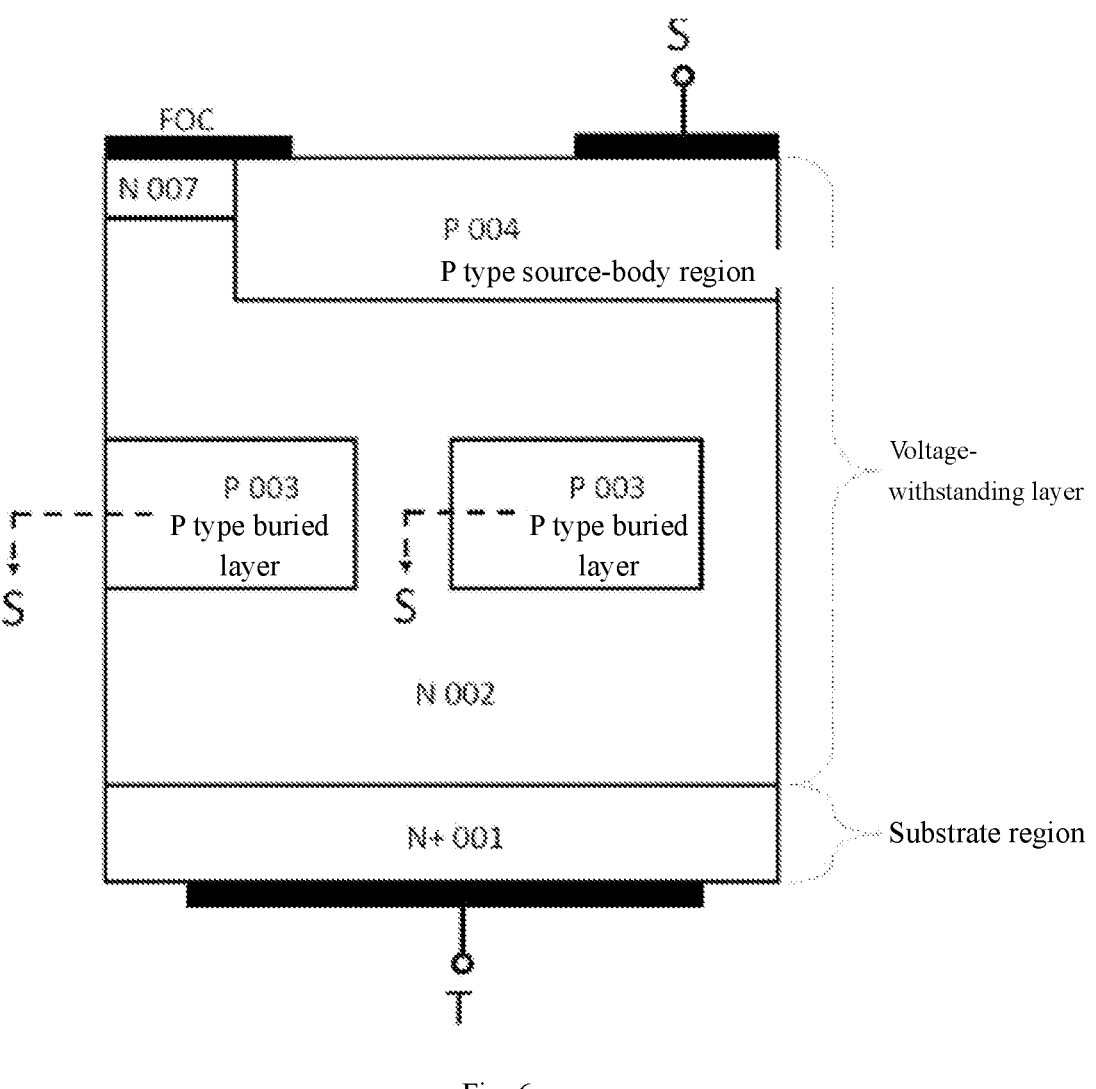
FIG. 6 is a schematic structural diagram of a fourth embodiment according to the present disclosure.

FIG. 6 is a schematic structural diagram of an embodiment in which two P-type buried layers 003 are used based on the embodiment in FIG. 2. As can be seen from description of the principle of the embodiment in FIG. 2, the output electrical characteristics of the TBC device in the present disclosure is determined by the width of the depletion region of the N-type voltage-sustaining layer 002 between the P-type buried layer 003 and the P-type source-body region 004. The two P-type buried layers 003 in FIG. 6 further optimizes the expansion range of the depletion layer, so it is easier to obtain the electrical characteristics of the embodiment in FIG. 2. Apparently, multiple P-type buried layers 003 may be provided, which will not be repeated here.

Figure 7:
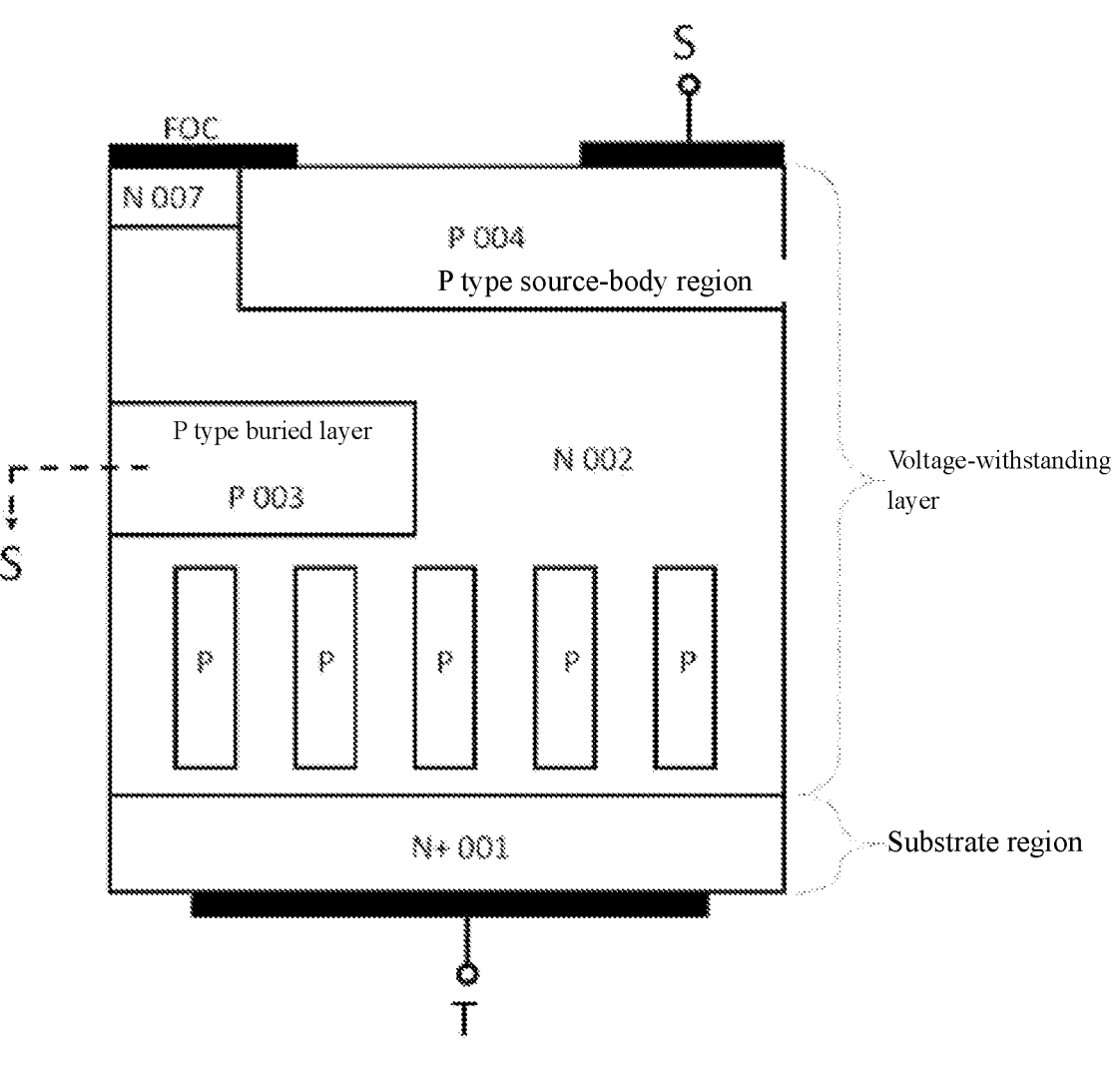
FIG. 7 is a schematic structural diagram of a fifth embodiment according to the present disclosure.

FIG. 7 is a schematic diagram of an embodiment in which a super-junction structure is used in the N-type voltage-sustaining layer 002 based on the embodiment in FIG. 2. The main feature of the embodiment in FIG. 7 is that a super-junction structure with an alternating arrangement NPNPNP is used in the N-type voltage-sustaining layer 002. It is well-known that lower on-resistance can be obtained at the same sustaining voltage by a super-junction structure.

Figure 8:
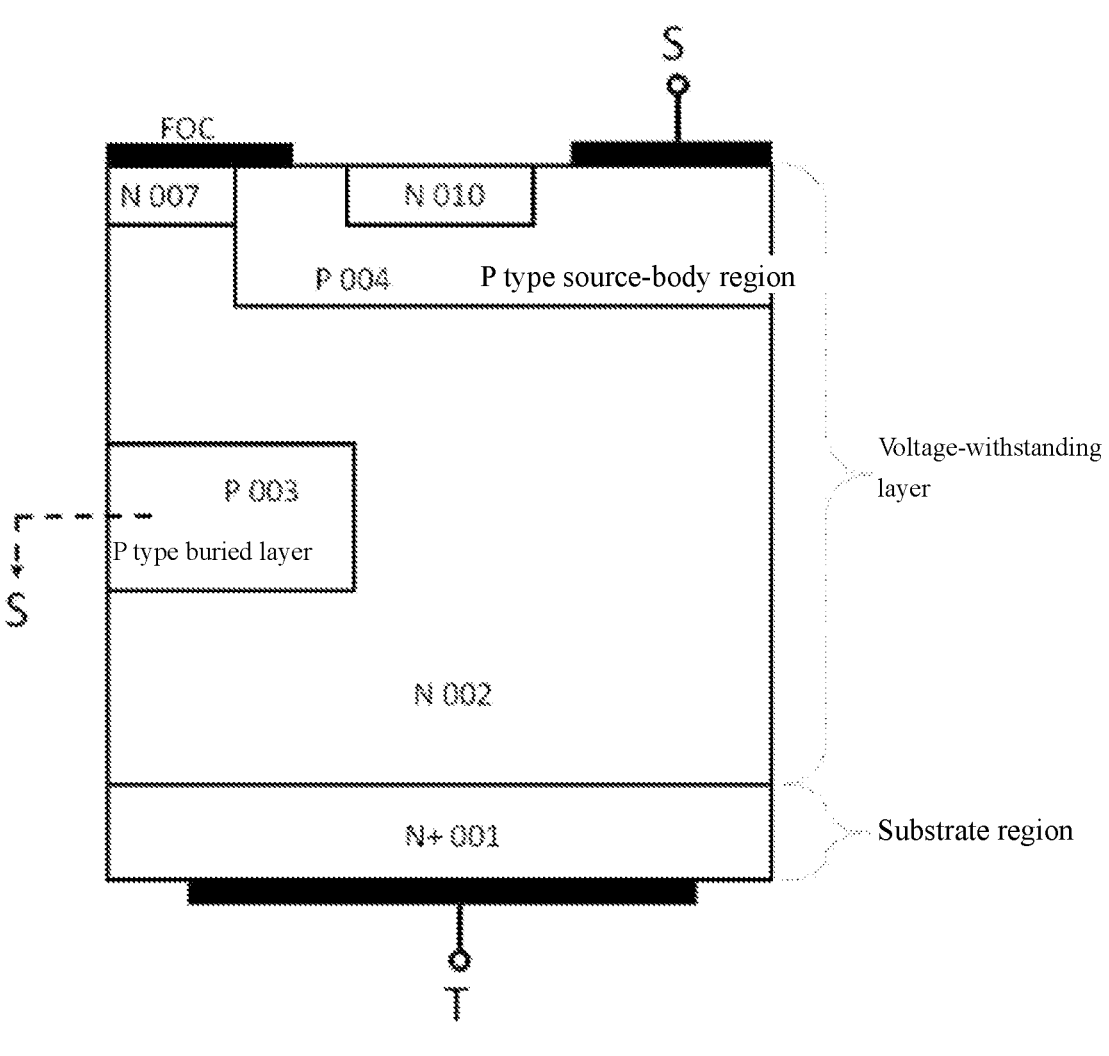
FIG. 8 is a schematic structural diagram of a sixth embodiment according to the present disclosure.

FIG. 8 is a schematic structural diagram of an embodiment in which an auxiliary N-type charge compensation region 010 is arranged in the P-type source-body region 004 based on the embodiment in FIG. 2. It can be seen from the principle of the embodiment in FIG. 2, when the value of $V_{ST}$ is large, most of the electric field lines emitted by the positive charges of the ionized donors in the depleted N-type 002 region are absorbed by the negative charges of the ionized acceptors in the depleted P-type source-body region 004, thereby changing the electric field distribution in the P-type source-body region 004. When the electric field direction in the P-type source-body region 004 changes from the original direction from the FOC to the electrode S, to a new direction from the electrode S to the FOC, there will no longer be current path between the electrode T and the electrode S, i.e., there is a blocking (high resistance) characteristic between the electrode T and the electrode S. In the embodiment in FIG. 8, an N-type auxiliary charge compensation region 010 is arranged in the P-type source-body region 004, so the effective charge dose of the P-type source-body region 004 decreases. Thus, the expansion rate of the depletion region in the P-type source-body region 004 is accelerated, and the electrical characteristic as shown in FIG. 1 can be obtained easily.

Figure 9:
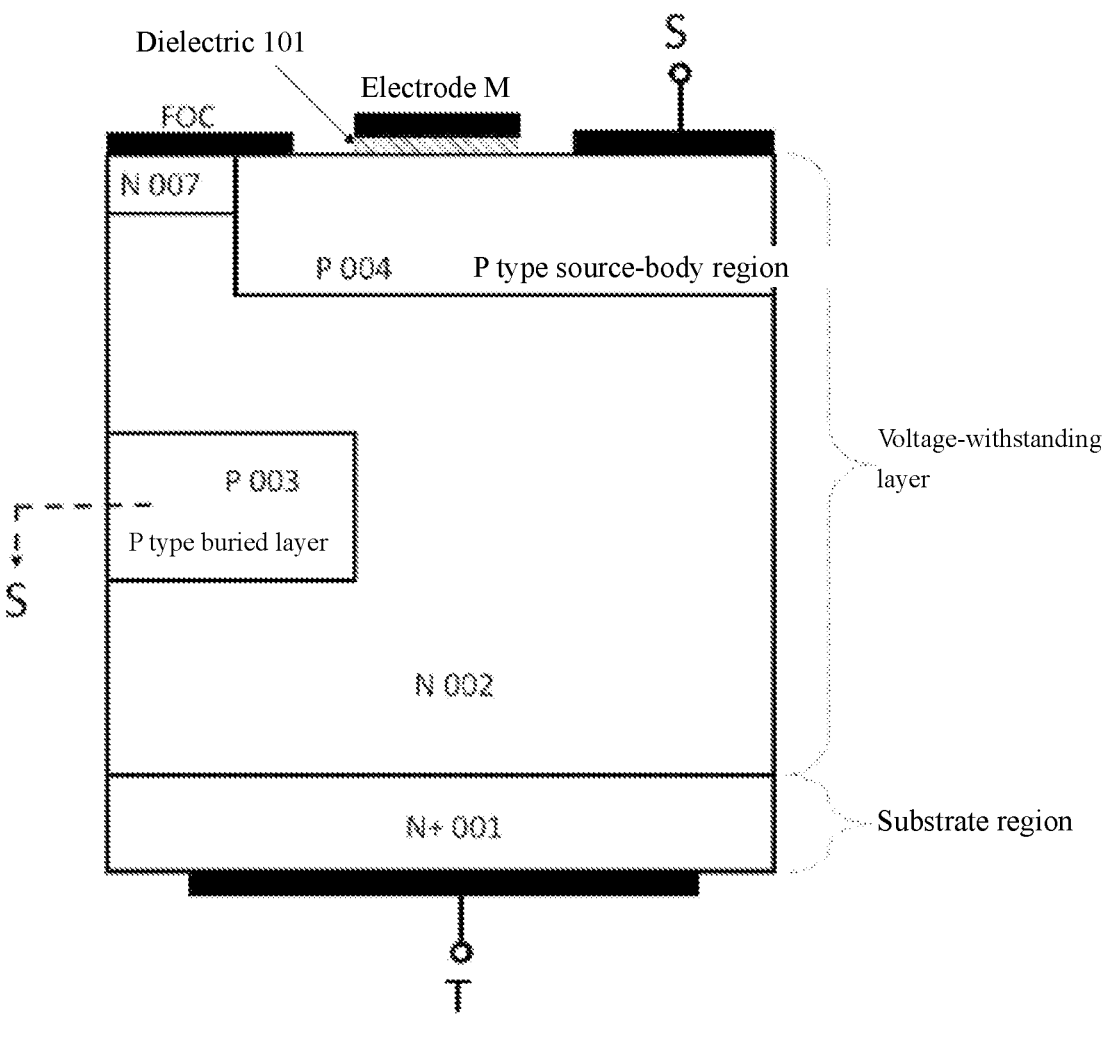
FIG. 9 is a schematic structural diagram of a seventh embodiment according to the present disclosure.

FIG. 9 is a schematic diagram of a plane "metal-insulator-semiconductor" (MIS) structure based on the embodiment in FIG. 2. A part of the P-type source-body region 004 is covered by an insulator layer 101, and the insulator layer 101 is covered by an electrode M. By applying a certain voltage to the electrode M, it is easy to change a width of a depletion region in the P-type source-body region 004, thereby adjusting the effective charge dose in the P-type source-body region 004.

Figure 10:
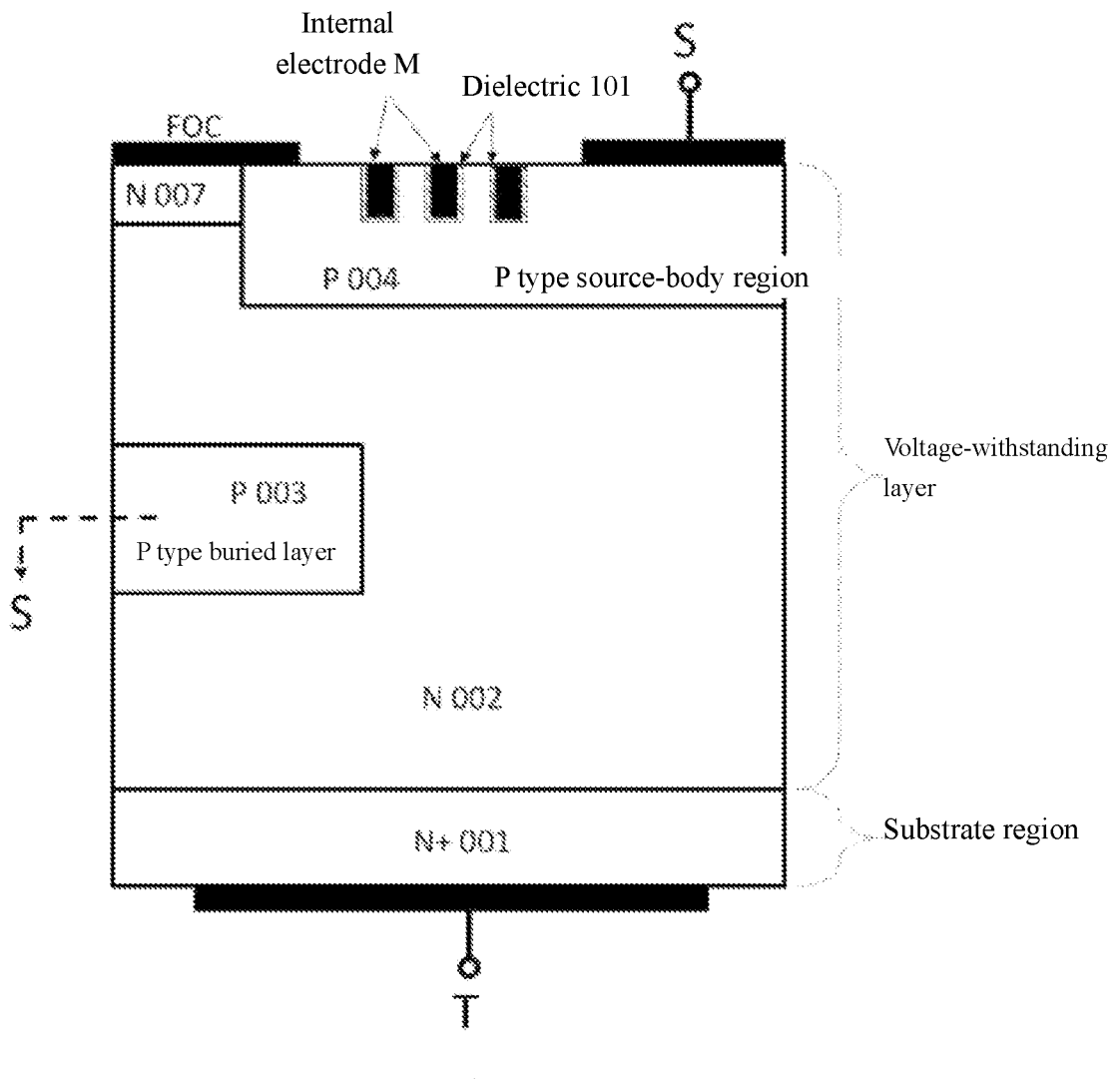
FIG. 10 is a schematic structural diagram of an eighth embodiment according to the present disclosure.

FIG. 10 is a schematic diagram of a trench-type "metal-insulator-semiconductor" (MIS) structure based on the embodiment in FIG. 2. A trench unit is arranged on an upper surface inside a part of the P-type source-body region 004, and conductive material is filled in the trench as electrode M, which is isolated from the P-type source-body region 004 by an insulator layer 101. By applying a certain voltage to the electrode M, it is easy to change a width of a depletion region in the P-type source-body region 004, thereby adjusting the effective charge dose of P-type source-body region 004. Apparently, one or more trench units may be provided.

While the present disclosure is described above in exemplary embodiments, the scope of protection of the present disclosure is defined by the claims and their equivalents.

We claim:

1. A current protection-type semiconductor device, comprising:
    at least one cell structure comprising a substrate region and a first-conduction-type voltage-sustaining layer arranged above the substrate region, wherein,
    a first-conduction-type current-commutation region and at least one second-conduction-type source-body region are arranged in an upper surface of the voltage-sustaining layer; at least one second-conduction-type buried layer is arranged in the voltage-sustaining layer and surrounded by the voltage-sustaining layer;
    a bottom of the substrate region is in contact with a first electrode; a second electrode and a floating ohmic contact electrode are arranged on the upper surface of the voltage-sustaining layer, the second electrode is in contact with the source-body region, and the floating ohmic contact electrode is in contact with the current-commutation region and the source-body region; and
    a conduction type of the substrate region is a first conduction type or a second conduction type, and when the conduction type of the substrate region is the first conduction type, a doping concentration of the substrate region is not less than that of the voltage-sustaining layer.

2. The current protection-type semiconductor device according to claim 1, wherein when the conduction type of the substrate region is the second conduction type, a first-conduction-type field-stop layer is arranged between the substrate region and the voltage-sustaining layer.

3. The current protection-type semiconductor device according to claim 2, wherein a first-conduction-type anode short-circuit region is arranged in the substrate region, one side of the anode short-circuit region is in contact with the field-stop layer and the other side of the anode short-circuit region is in contact with the first electrode.

4. The current protection-type semiconductor device according to claim 3, wherein a super-junction structure with an alternating arrangement of the first conduction type and the second conduction type is arranged in the voltage-sustaining layer.

5. The current protection-type semiconductor device according to claim 3, wherein a first-conduction-type of charge compensation region is arranged in an upper surface inside the source-body region.

6. The current protection-type semiconductor device according to claim 3, wherein a plane metal-insulator-semiconductor structure is arranged on an upper surface outside the source-body region, and a metal layer of the plane metal-insulator-semiconductor structure is a third electrode.

7. The current protection-type semiconductor device according to claim 3, wherein a trench-type metal-insulator-semiconductor structure is arranged in the upper surface inside the source-body region, and a metal layer of the trench-type metal-insulator-semiconductor structure is a third electrode.

8. The current protection-type semiconductor device according to claim 2, wherein a super-junction structure with an alternating arrangement of the first conduction type and the second conduction type is arranged in the voltage-sustaining layer.

9. The current protection-type semiconductor device according to claim 2, wherein a first-conduction-type charge compensation region is arranged in an upper surface inside the source-body region.

10. The current protection-type semiconductor device according to claim 2, wherein a plane metal-insulator-semiconductor structure is arranged on an upper surface outside the source-body region, and a metal layer of the plane metal-insulator-semiconductor structure is a third electrode.

11. The current protection-type semiconductor device according to claim 2, wherein a trench-type metal-insulatorsemiconductor structure is arranged in an upper surface inside the source-body region, and a metal layer of the trench-type metal-insulator-semiconductor structure is a third electrode.

12. The current protection-type semiconductor device according to claim 1, wherein a super-junction structure with an alternating arrangement of the first conduction type and the second conduction type is arranged in the voltage-sustaining layer.

13. The current protection-type semiconductor device according to claim 1, wherein a first-conduction-type charge compensation region is arranged in an upper surface inside the source-body region.

14. The current protection-type semiconductor device according to claim 1, wherein a plane metal-insulator-semiconductor structure is arranged on an upper surface outside the source-body region, and a metal layer of the plane metal-insulator-semiconductor structure is a third electrode.

15. The current protection-type semiconductor device according to claim 1, wherein a trench-type metal-insulator-semiconductor structure is arranged in an upper surface inside the source-body region, and a metal layer of the trench-type metal-insulator-semiconductor structure is a third electrode.

* * * * *